United States Patent
Kennedy et al.

(12)

(10) Patent No.: US 6,505,545 B2
(45) Date of Patent: Jan. 14, 2003

(54) METHOD AND SYSTEM FOR PROCESSING FOOD

(76) Inventors: Melvin R. Kennedy, 825 Marbella La., Lantana, FL (US) 33842; Jose Longoria, 8325 SW. 108th St., Miami, FL (US) 33158; Robert G. Robbins, 1124 Parkside Cir. N., Boca Raton, FL (US) 33486

( * ) Notice: Subject to any disclaimer, the term of this patent is extended or adjusted under 35 U.S.C. 154(b) by 33 days.

(21) Appl. No.: 09/822,039

(22) Filed: Mar. 30, 2001

(65) Prior Publication Data

US 2002/0001650 A1 Jan. 3, 2002

Related U.S. Application Data

(60) Provisional application No. 60/193,856, filed on Mar. 30, 2000.

(51) Int. Cl.[7] .............. A23L 1/00; A47J 27/00; A47J 27/04; A47J 43/04; A47J 43/07
(52) U.S. Cl. .............. 99/331; 99/337; 99/348; 99/492; 366/145; 366/146; 366/314
(58) Field of Search ............ 99/326–333, 337, 99/338, 348, 484, 492, 509–513; 366/144–146, 314, 601; 241/37.5, 92, 282.1, 101.01, 282.2, 101.2; 426/523, 443, 478

(56) References Cited

U.S. PATENT DOCUMENTS

| | | | |
|---|---|---|---|
| 4,649,810 A | | 3/1987 | Wong |
| 4,878,627 A | | 11/1989 | Otto |
| 5,363,746 A | * | 11/1994 | Gordon ................ 99/328 |
| 5,415,081 A | * | 5/1995 | Yoshida et al. ........ 99/326 |
| 5,497,695 A | | 3/1996 | Canela |
| 5,605,090 A | * | 2/1997 | Mantani et al. ....... 99/326 |
| 5,768,978 A | | 6/1998 | Dorner et al. |
| 5,794,524 A | | 8/1998 | Kemker et al. |
| 5,819,636 A | | 10/1998 | Khaskoggi |
| 5,921,485 A | | 7/1999 | Plavcan et al. |

* cited by examiner

Primary Examiner—Timothy F. Simone
(74) Attorney, Agent, or Firm—Akerman Senterfitt

(57) ABSTRACT

A food preparation system and method, including a base housing, a container detachably engagable with the base housing in which the container is adapted to receive food products. The system also includes a heater within the base housing and/or the container for converting a liquid into a cooking vapor, and a blade rotatably mounted in the container in which the blade supports the food products during a cooking step and processes the food products during a processing step. The system can also have positioning structure within the base housing and/or the container for positioning the blade in a cooking position during the cooking step, and for positioning the blade in a processing position during the processing step.

21 Claims, 5 Drawing Sheets

METHOD AND SYSTEM FOR PROCESSING FOOD

CROSS-REFERENCE TO RELATED APPLICATIONS

This application claims the benefit of provisional application number 60/193,856 filed Mar. 30, 2000.

STATEMENT REGARDING FEDERALLY SPONSORED RESEARCH OR DEVELOPMENT (Not Applicable)

BACKGROUND OF THE INVENTION

1. Field of the Invention

The present invention relates generally to a food preparation method and system, and more particularly to a method and system for individually or simultaneously cooking and processing food.

2. Description of the Related Art

A wide variety of food processing devices exist in the prior art including, for example, devices which can slice, chop, shred, puree or otherwise aid in the preparation of food products. Food processing devices are used to provide processed food products as an alternative to solid food. Such processed foods can be consumed by infants or any other individual who cannot ingest solid foods. To fulfill this need, there are numerous commercially processed foods from which to choose; however, many of these products contain preservatives, fillers, and thickening agents. As they become increasingly health conscious in their eating habits, consumers will often prefer to prepare their meals from fresh meats and vegetables instead of purchasing commercially prepared foods.

Processing fresh food to create such meals, however, is often time-consuming and inefficient. Specifically, once the food is initially cooked, its preparation frequently requires a separate cooking or heating step. Moreover, the extra cooking step involves the use of cookware and cooking utensils which must be cleaned once the processed food is served. Thus, it is desirable to provide a food preparation system which can both cook and process food to create a ready-to-eat food product.

SUMMARY OF THE INVENTION

In accordance with the inventive arrangements, a food preparation system and method is provided. The system includes a base housing, a container detachably engagable with the base housing in which the container is adapted to receive food products. The system also includes a heater within the base housing and/or the container for converting a liquid into a cooking vapor, and a blade rotatably mounted in the container in which the blade supports the food products during a cooking step and processes the food products during a processing step. The system can also have positioning structure within the base housing and/or the container for positioning the blade in a cooking position during the cooking step, and for positioning the blade in a processing position during the processing step.

A method according to the invention includes placing food products on a blade rotatably mounted in a container in which the blade contains at least one blade element and the blade element contains at least one vapor vent. The method can also include placing the blade in a cooking position, converting a liquid into a cooking vapor, directing the cooking vapor through the vapor vent, cooking the food products with the cooking vapor; placing the blade in a processing position, and processing the food products.

In one arrangement of the above system and method, the blade can include a blade column. The system can also include at least one blade element attached to the blade column in which the blade elements contain at least one vapor vent through which the cooking vapor may pass. In another arrangement of the above system and method, the blade elements can extend outwardly from the blade column and the blade elements can combine to form a substantially circular or elliptical storage area for the food products during the cooking step. In this arrangement, at least one of the blade elements can have a cutting edge for processing the food products during the processing step. In addition, the blade elements can be positioned in separate substantially vertical planes, and opposing blade elements can be positioned in substantially the same vertical position.

In another aspect, the processing position of the blade can be lower than the cooking position of the blade. In one arrangement, the processing position of the blade can be substantially adjacent to the bottom surface of the container and the cooking position of the blade can be above the processing position.

In another aspect of the above system and method, the blade can include a blade column and at least one blade element in which the blade element can contain at least one vapor vent. The blade column can have an interior cavity and a vapor outlet. The blade column can cooperate with a projection attached to the container to create a vapor channel in which the cooking vapor can flow through the vapor channel, the vapor outlet and the vapor vent during the cooking step. In one arrangement, the projection can be substantially cylindrical, and the vapor channel can be a plurality of substantially concentric channels. Further, the vapor outlet can be an annular vapor vent located below the vapor vents.

In another arrangement of the above system and method, the container can retain the condensate from the cooking vapor when the cooking vapor condenses. The condensate can be mixed with the food products during the processing step. The container can also have a lid detachably mounted to the container. The container can also have an exhaust vent for preventing excessive pressures in the container.

In another aspect, the system and method can include a fuse in which the fuse can shut off the heater if the temperature within the system rises above a predetermined temperature. In one arrangement, the fuse can be a resettable fuse that can automatically restore power to the heater if the temperature within the system drops below the predetermined temperature. Alternatively, the fuse can be a safety fuse that must be manually reset when the temperature within the system drops below the predetermined temperature. In another arrangement, the system and method can include a safety switch for preventing operation of the system unless the lid is properly mounted on the container.

In another aspect, the system and method can include a microprocessor for controlling time intervals of the cooking and processing steps. The microprocessor can execute the cooking and processing steps in an automated sequence.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
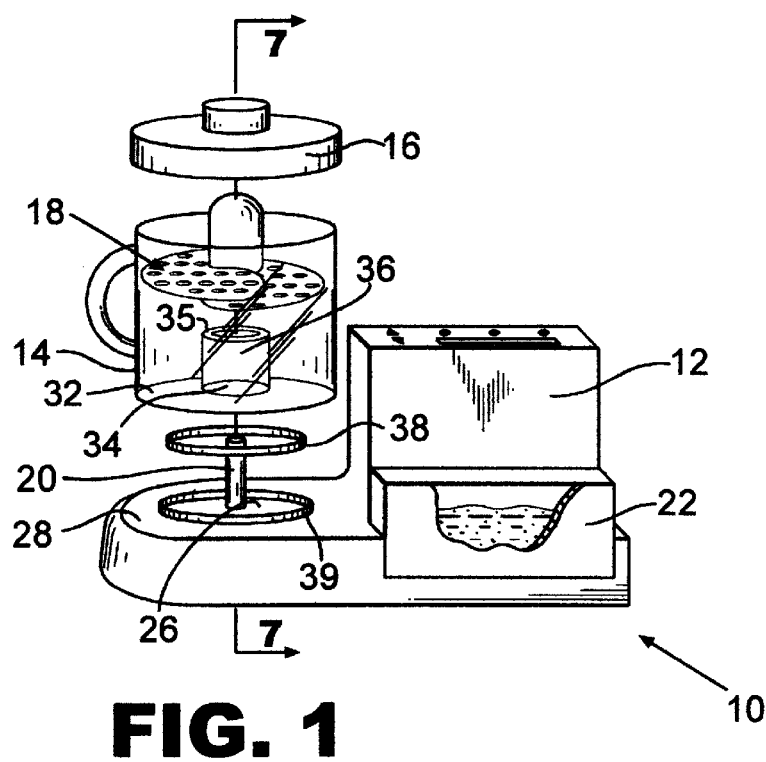
FIG. 1 is an exploded perspective view of an embodiment of the invention.

A food preparation system 10 for processing and cooking food products is illustrated in FIG. 1. The system 10 can cook and process any suitable type of food product including solid and/or liquid foods. The system 10 includes a base housing 12, a container 14 and at least one blade 18. The base housing can include a reservoir 22 for holding a liquid to be converted into its associated vapor. Typically, the reservoir holds water to be converted into steam. An outlet port 26 for the vapor can be provided in the base housing 12. In addition, the base housing 12 can include a container platform 28 and a driving shaft 20 extending substantially upwardly from the container platform 28. The base housing 12 can also include a motor (not shown) to rotate the shaft 20 relative to the base housing 12. The blade 18 can be detachably mounted on the shaft 20.

In one arrangement, the container 14 is generally cylindrical in shape; however, the invention is not limited in this regard, as the container 14 can be any other suitable shape. The container 14 can include a lid 16, which can be detachably mounted on the container 14. The container 14 can also include a projection 36 attached to a bottom surface 32 of the container 14. In one arrangement, the projection 36 can be substantially cylindrical in shape; however, the invention is not limited in this regard, as the projection 36 can be any other suitable shape. The projection 36 can have a first aperture 34 for receiving the shaft 20 and a second aperture 35 at the end opposite that of the first aperture 34. As will be explained in detail later, the blade 18 can be positioned over the projection 36 to create a cooking vapor path.

For sealing purposes, a first gasket 38 can be affixed to the bottom surface 32, and a second gasket 39 with a radius larger than that of the first gasket can be affixed to the surface of the container platform 28. When the container 14 is placed on the container platform 28, the first gasket 38 can engage the second gasket 39 thereby creating a seal. Although typically formed of rubber, the first gasket 38 and the second gasket 39 can be constructed of any material suitable for producing such a seal. Additionally, while FIG. 1 illustrates the system 10 as having a first gasket 38 and a second gasket 39, the system 10 can have any number of gaskets for forming the proper seal. In addition, the first gasket 38 can have a larger radius than the second gasket 39.

In one arrangement, the outlet port 26 can be positioned on the container platform 28 such that the outlet port 26 is within the perimeter of the first gasket 38. The outlet port 26 can also be positioned to direct the cooking vapor into the first aperture 34 of the projection 36 when the container 14 is in place on the container platform 28.

Figure 2:
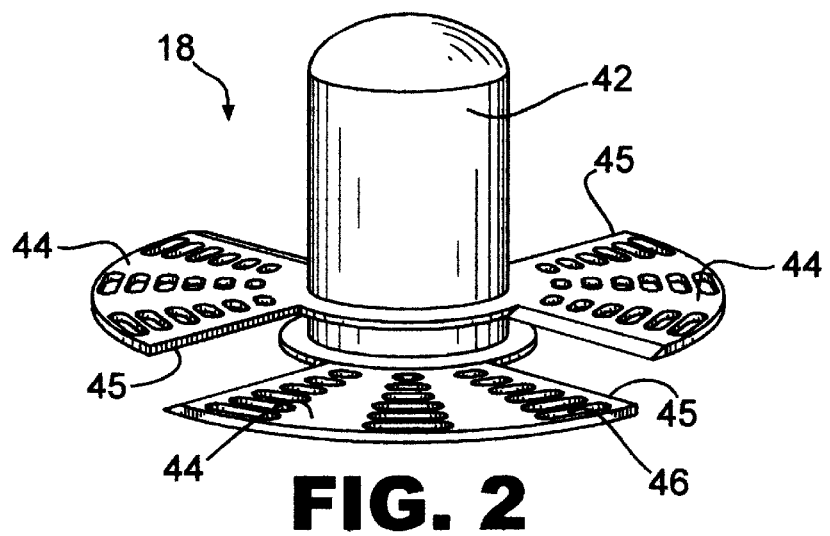
FIG. 2 is a perspective view of a blade in accordance with the inventive arrangements.
Figure 3:
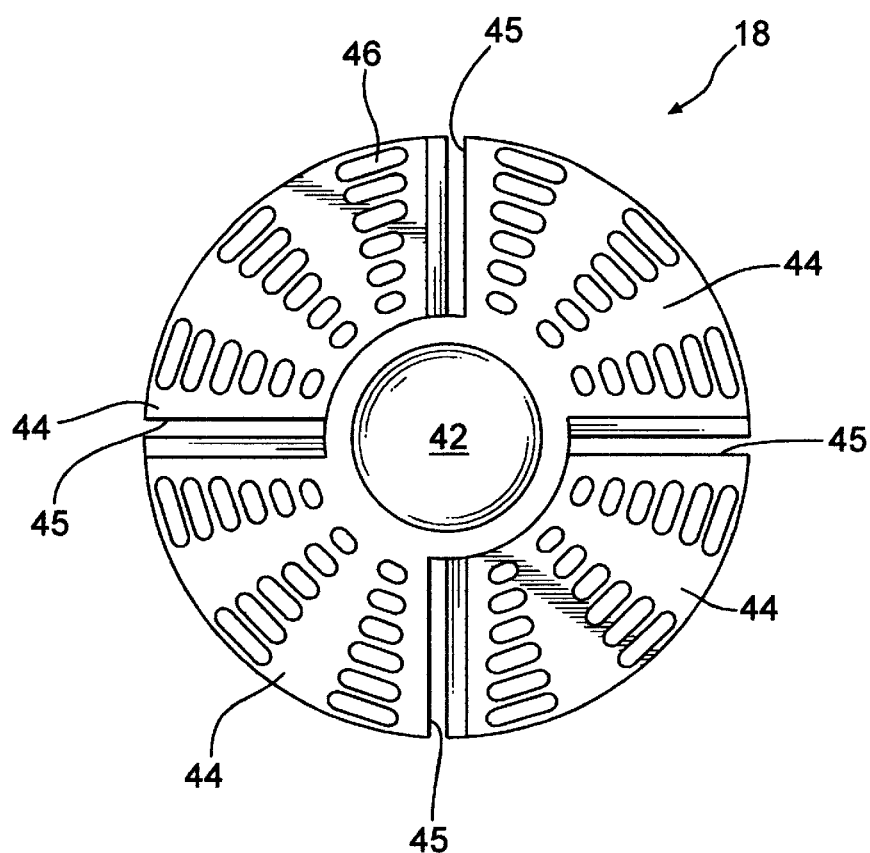
FIG. 3 is a top plan view of the blade illustrated in FIG. 2.
Figure 4:
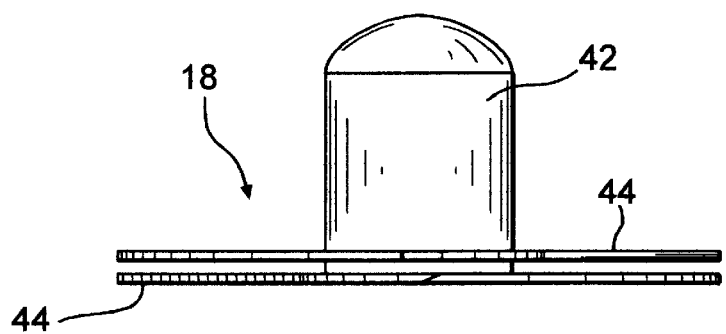
FIG. 4 is a side elevational view of the blade illustrated in FIG. 2.

FIGS. 2–4 illustrate a blade 18 in accordance with the inventive arrangements. The blade 18 can include a blade column 42 and at least one blade element 44 extending substantially perpendicularly outwardly from the blade column 42. In one arrangement, the blade elements 44 can combine to form a substantially circular storage area for the food products as the food products are cooked. In addition, the blade elements 44 can extend to a position that is less than the inner circumference of the container 14. In one arrangement, the blade elements 44 can extend to a position that is slightly less than the inner circumference of the container 14. Such an arrangement maximizes the combined surface area of the blade elements 44 while permitting free rotation of the blade 18. Although FIG. 1 illustrates the system 10 as having only one blade 18, the invention is not limited in this regard, as the system 10 can include any number of blades 18.

As shown in FIG. 2, the blade elements 44 can extend radially from the blade column 42 at approximately 90° intervals. It should be noted, however, that the invention is not limited in this regard, as the blade elements 44 can extend from the blade column 42 at any other suitable interval. As shown in FIGS. 2 and 4, the blade elements 44 can be attached to the blade column 42 at any number of vertical positions to form a multi-level blade. Although FIG. 2 illustrates the blade 18 as having four blade elements 44 in which opposing blade elements 44 are positioned in substantially the same vertical plane, the invention is not so limited as the blade 18 can include any number of blade elements 44 attached to any suitable position on the blade column 42.

As shown in FIG. 2 and 3, each blade element 44 can include at least one cutting edge 45. Each cutting edge 45 can be attached to its associated blade element 44 at any position suitable for chopping food placed within the container 14. In addition, each blade element 44 can contain a plurality of vapor vents 46 through which the cooking vapor may rise to cook food that has been placed on the blade elements 44.

Figure 5A:
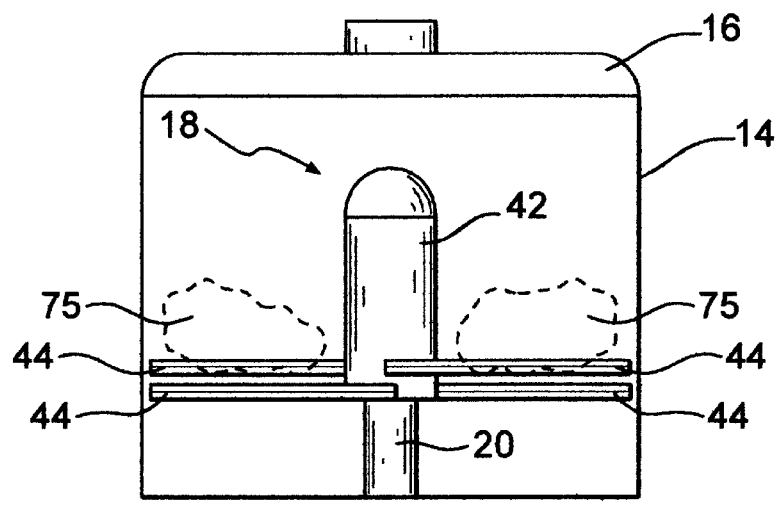
FIG. 5A is a side elevational view of a container and a blade in which the blade is in a cooking position.
Figure 5B:
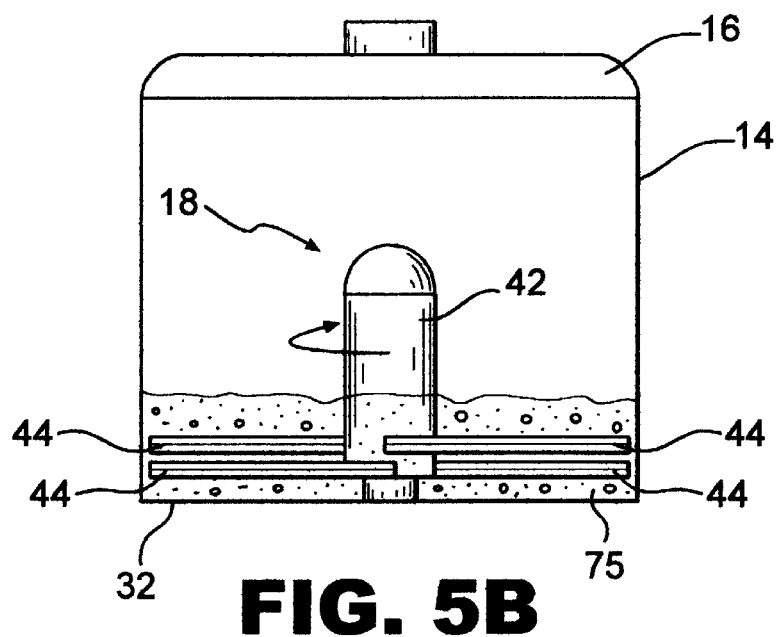
FIG. 5B is a side elevational view of a container and a disk blade in which the disk blade is in a second position.

FIGS. 5A and 5B illustrate the container 14 and the blade 18 in the processes of cooking (FIG. 5A) and processing (FIG. 5B). As shown in FIGS. 5A and 5B, the blade 18 has been placed over the projection 36 (not pictured). In one arrangement, the blade 18 can be in a first position during the cooking step, as shown in FIG. 5A and in a second position during the processing step, as shown in FIG. 5B. During the cooking step, the driving shaft 20 can be stationary. In another arrangement, however, the driving shaft 20 can rotate during the cooking process for more uniform cooking. As shown in FIG. 5A, the food 75 to be cooked can be placed on the surfaces of the blade elements 44. Placing the blade 18 in a first position as shown in FIG. 5A can position the food above the vapor path to ensure even cooking. It should be noted, however, that the first position shown in FIG. 5A is merely an example, as the blade 18 can be placed in any position suitable for cooking food during the cooking step.

Referring to FIG. 5B, during the processing step, the blade column 42 can impart a rotational force onto the blade elements 44. Although FIG. 5B illustrates the blade 18 turning in a counter-clockwise direction, the blade is not limited to this particular direction, as the blade 18 can also turn in a clockwise direction. As shown in FIG. 5B, once the rotational force is initiated, the blade 18 can move to a second position closer to the bottom surface 32 of the container 14, which in turn causes the blade elements 44 to move closer to the bottom surface 32. In one arrangement, the blade elements 44 can be moved substantially adjacent to the bottom surface 32 of the container. Moving the blade elements 44 closer to the bottom surface 32 of the container 14 during the processing step ensures uniform processing of the food. Similar to the first position during the cooking step, however, the second position shown in FIG. 5B is merely an example, as the blade 18 can be placed in any position suitable for processing food during the processing step.

Figure 6:
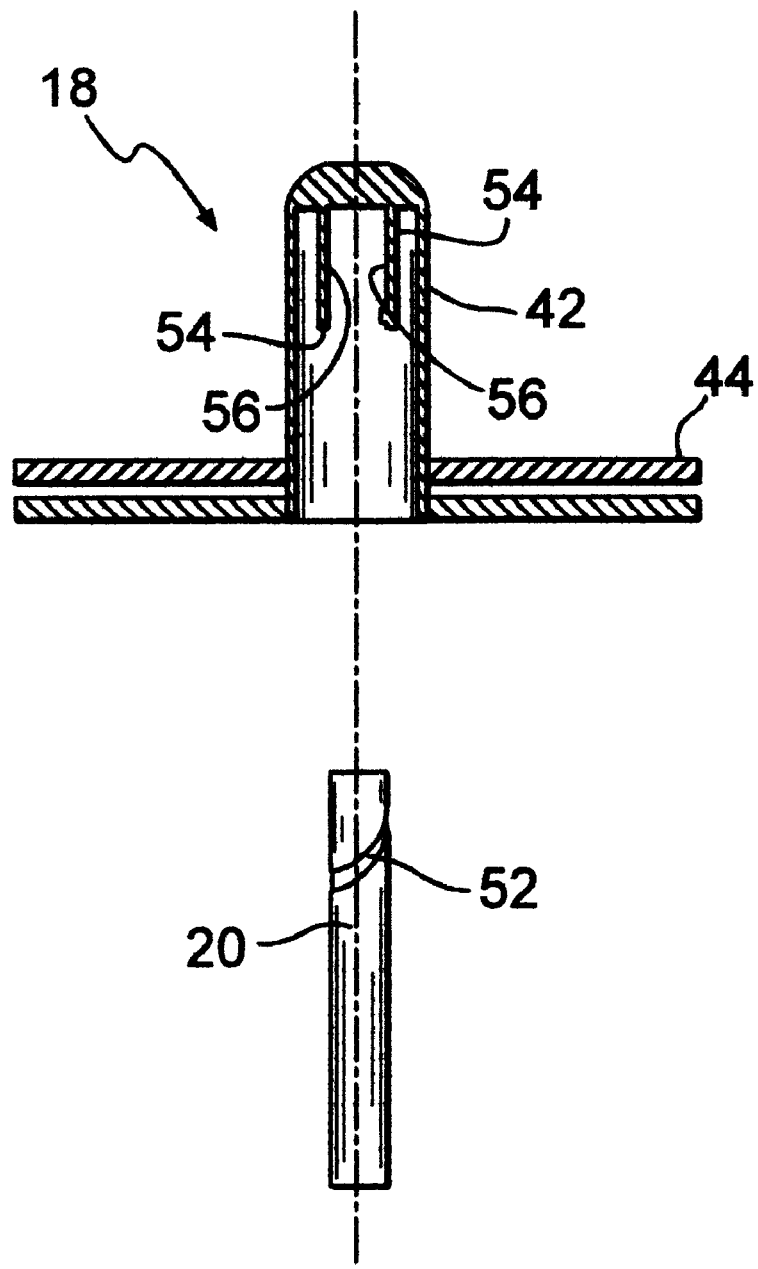
FIG. 6 is an exploded view of a rotating shaft and a blade.

The invention contemplates a number of arrangements to achieve the adjustment of the blade 18 with respect to the shaft 20, as described above. FIG. 6 illustrates the shaft 20, the blade column 42 and the blade elements 44. As pictured, the shaft 20 can include a groove 52. The blade column 42 can include a socket 54 to receive the shaft 20. In one arrangement, the interior surface 55 of the socket 54 can include a pin 56 adapted for sliding engagement with the groove 52. The pin 56 can cooperate with the groove 52 to prevent free rotation of the blade 18 with respect to the shaft 20 when the shaft 20 is rotated.

In operation, the blade 18 can be placed on the shaft 20 and can be rotated until the pin 56 becomes seated in the upper portion of the groove 52. When the shaft 20 is rotated, force produced by the blade's rotation can urge the pin 56 downwardly along the groove 52. The groove 52 thus provides a camming action to urge the blade 18 to the second position for processing. When rotation of the blade 18 is halted, the pin 56 can return to the upper portion of the groove 52, and the blade 18 can return to its original first position. Although FIG. 6 illustrates the groove 52 as being helical in shape, it should be noted that any suitably-shaped groove can be used to engage the pin 56.

Figure 7:
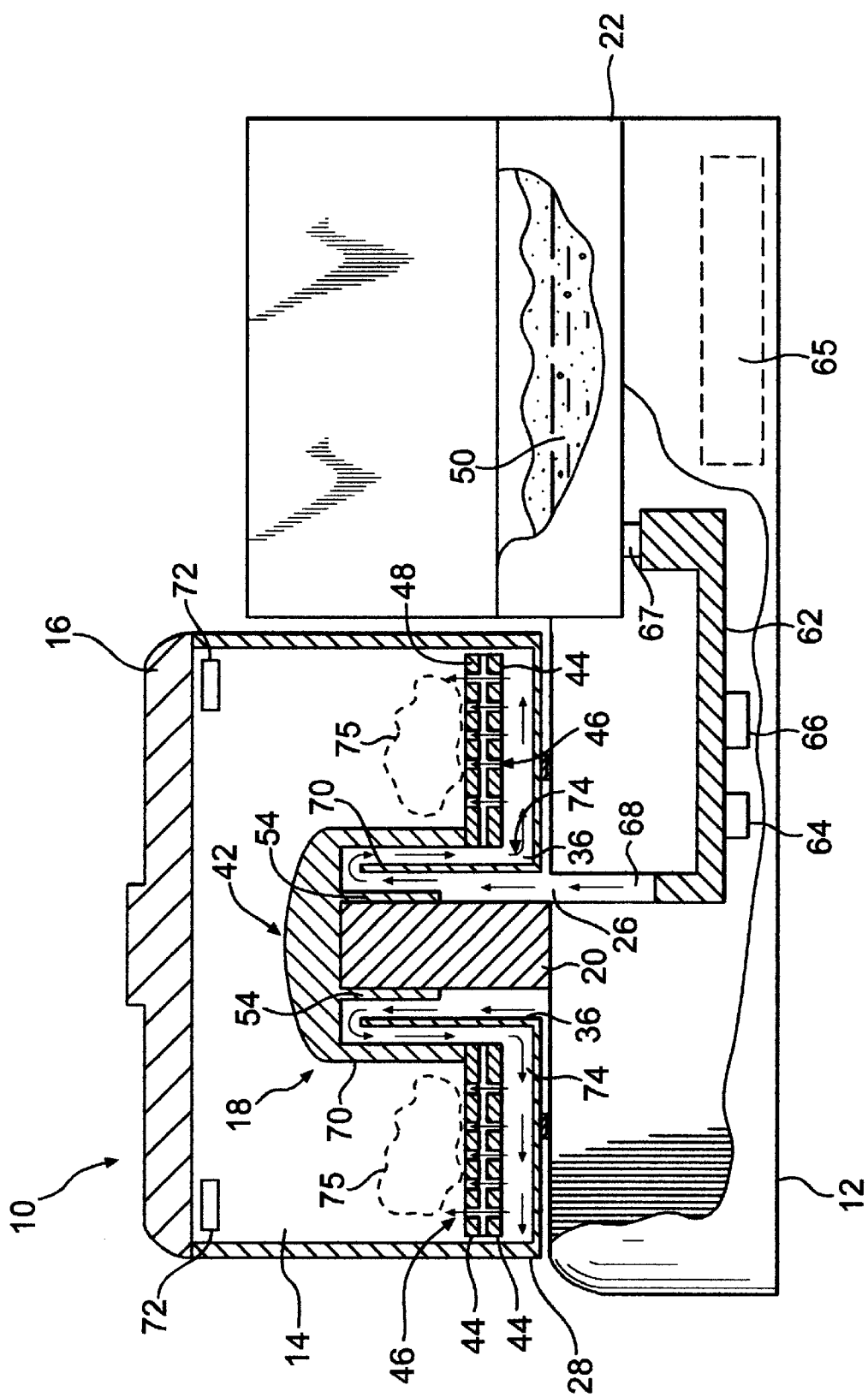
FIG. 7 is a cross-sectional view taken along line 7—7 of FIG. 1 showing a vapor path in accordance with the inventive arrangements.

The cross-sectional view in FIG. 7, taken along line 7—7 of FIG. 1, schematically illustrates the operation of the system 10. The system 10 can include a motor 65 for driving the shaft 20. A liquid 58, such as water, to be converted into vapor can be placed in the reservoir 22. The liquid 58 can then be conveyed through a conduit 67 to a heater 62. The heater 62 may be any device suitable for converting the liquid 58 into a cooking vapor. In one arrangement, the heater 62 has one or more fuses which can serve as safety devices. As an example, the fuses can include a resettable fuse 64 and a safety fuse 66. In another arrangement, the resettable fuse 64 can be set to open at approximately 213° F., and the safety fuse 66 can be set to open at approximately 230° F. It should be noted that, however, that the invention can include any number of fuses, each of which may be set to open at varying values. The temperature for each fuse can be taken anywhere in the system 10 such as anywhere in the base housing 12 or the container 14. The system 10 can also include one or more safety switches (not pictured) which can prevent operation of the system 10 if the container 14 is not properly mounted on the container platform 28 or if the lid 16 is not properly engaged with the container 14.

The heater 62 can heat the liquid 58 until at least part of the liquid 58 evaporates into vapor. The vapor can then rise through a vapor conduit 68 and can exit the base housing 12 through the outlet port 26. The blade column 42 can include an interior cavity 70 which can cooperate with the projection 36 of the container 14 to form one or more vapor channels 70. In one arrangement, the vapor channels 70 can be nested, substantially concentric channels. The invention, however, is not limited in this regard, as the vapor channels 70 can be any other suitable shape. The vapor channels 70 can guide the vapor from the outlet port 26 to a vapor outlet 74 on the blade column 42. In another arrangement, the vapor outlet 74 can be an annular vapor outlet and can be located on the blade column 42 such that the vapor outlet 74 is located below the vapor vents 46. In this arrangement, the cooking vapor can exit the vapor outlet 74 and can then rise upward through the vapor vents 46 in the blade elements 44 to cook the food 75 which has been placed on the surfaces of the blade elements 44.

Continuing with FIG. 7, the container 14 can include one or more exhaust vents 72 which can allow a certain amount of the cooking vapor to escape. In an alternative arrangement, these vents 72 can be placed on the lid 16. The remaining vapor can form condensate within the container 14. In one arrangement, the condensate formed within the container 14 can be retained to be mixed with the cooked food during the chopping process. This additional liquid can improve the quality of the processed food product. Moreover, the amount of condensate remaining in the container 14 after the cooking process is often approximately the amount of liquid required to improve the quality of the processed food product.

As noted in the foregoing discussion, the chopping process can be initiated after the food has been cooked. The invention is not limited in this regard, however, as the food can be chopped prior to the cooking step. Further, the chopping and cooking steps may be combined so that these steps are performed simultaneously.

The operation of the cooking and chopping processes can be controlled by a microprocessor (not shown). In particular, the microprocessor can control the time intervals for the cooking and chopping processes and can execute these processes in an automated sequence. The microprocessor can include a memory for storing procedures specific to the type of food to be processed. Additionally, the microprocessor can allow a user to create custom made settings for the cooking and chopping intervals.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

What is claimed is:

1. A food preparation system, comprising:

a base housing;

a container detachably engagable with said base housing wherein said container is adapted to receive food products;

a heater within at least one of said base housing and said container for converting a liquid into a cooking vapor; and a blade rotatably mounted in said container wherein said blade supports the food products during a cooking step and processes the food products during a processing step.

2. The system according to claim 1, wherein said blade comprises:

a blade column; and at least one blade element attached to said blade column wherein said blade elements contain at least one vapor vent through which the cooking vapor may pass, said blade elements extending outwardly from said blade column, said blade elements combining to form a substantially circular or elliptical storage area for the food products during said cooking step.

3. The system according to claim 2, wherein at least one of said blade elements has a cutting edge for processing the food products during said processing step.

4. The system according to claim 3, wherein said blade elements are positioned in separate substantially vertical planes.

5. The system according to claim 4, wherein opposing blade elements are positioned in substantially the same vertical position.

6. The system according to claim 1, wherein said processing position of said blade is lower than said cooking position of said blade.

7. The system according to claim 6, wherein said processing position of said blade is substantially adjacent to the bottom surface of said container and said cooking position of said blade is above said processing position.

8. The system according to claim 1, wherein said blade includes a blade column and at least one blade element, said blade element containing at least one vapor vent, said blade column having an interior cavity and a vapor outlet, said blade column cooperating with a projection attached to said container to create a vapor channel, wherein the cooking vapor flows through said vapor channel, said vapor outlet and said vapor vent during said cooking step.

9. The system according to claim 8, wherein said projection is substantially cylindrical.

10. The system according to claim 8, wherein said vapor channel is a plurality of substantially concentric channels.

11. The system according to claim 8, wherein said vapor outlet is an annular vapor vent located below said vapor vents.

12. The system according to claim 1, wherein said container retains the condensate from the cooking vapor when the cooking vapor condenses.

13. The system according to claim 1, wherein said container has a lid, said lid detachably mounted to said container.

14. The system according to claim 1, further comprising a fuse wherein said fuse shuts off said heater if the temperature within said system rises above a predetermined temperature.

15. The system according to claim 14, wherein said fuse is a resettable fuse, said resettable fuse automatically restoring power to said heater if the temperature within said system drops below said predetermined temperature.

16. The system according to claim 14, wherein said fuse is a safety fuse whereby said safety fuse must be manually reset when the temperature within said system drops below said predetermined temperature.

17. The system according to claim 13, further comprising a safety switch, said safety switch preventing operation of said system unless said lid is properly mounted on said container.

18. The system according to claim 1, further comprising a microprocessor for controlling time intervals of said cooking and processing steps.

19. The system according to claim 18, wherein said microprocessor executes said cooking and processing steps in an automated sequence.

20. The system according to claim 1, wherein said container contains an exhaust vent for preventing excessive pressures in said container.

21. The system according to claim 1, further comprising positioning structure within at least one of said base housing and said container for positioning said blade in a cooking position during said cooking step and for positioning said blade in a processing position during said processing step.

* * * * *